(12) United States Patent
Cheetancheri et al.

(10) Patent No.: US 12,058,154 B2
(45) Date of Patent: *Aug. 6, 2024

(54) REAL-TIME PREVENTION OF MALICIOUS CONTENT VIA DYNAMIC ANALYSIS

(71) Applicant: SONICWALL INC., Milpitas, CA (US)

(72) Inventors: Senthil Cheetancheri, Fremont, CA (US); Alex Dubrovsky, Los Altos, CA (US); Sachin Holagi, Fremont, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,796

(22) Filed: Sep. 21, 2022

(65) Prior Publication Data

US 2023/0020421 A1    Jan. 19, 2023

Related U.S. Application Data

(63) Continuation of application No. 17/128,639, filed on Dec. 21, 2020, now Pat. No. 11,558,405, which is a
(Continued)

(51) Int. Cl.
*H04L 9/40* (2022.01)
*G06F 21/56* (2013.01)

(52) U.S. Cl.
CPC ........ *H04L 63/1416* (2013.01); *G06F 21/567* (2013.01); *H04L 63/0245* (2013.01);
(Continued)

(58) Field of Classification Search
CPC ............... G06F 21/567; H04L 63/1416; H04L 63/0245; H04L 63/1433; H04L 63/145; H04L 63/1441
(Continued)

(56) References Cited

U.S. PATENT DOCUMENTS 6,154,844 A   11/2000  Touboul et al.
6,804,780 B1  10/2004  Touboul
(Continued)

FOREIGN PATENT DOCUMENTS

CA   3017941      9/2017
EP   3 732 571   11/2020
(Continued)

OTHER PUBLICATIONS

Nethercote, Nicholas; "Dynamic binary analysis and instrumentation", Technical Report, UCAM-CL-TR-606, ISSN 1476-2986, Nov. 2004.
(Continued)

*Primary Examiner* — Teshome Hailu
(74) *Attorney, Agent, or Firm* — Polsinelli LLP

(57) ABSTRACT

This disclosure is related to methods and apparatus used to for preventing malicious content from reaching a destination via a dynamic analysis engine may operate in real-time when packetized data is received. Data packets sent from a source computer may be received and be forwarded to an analysis computer that may monitor actions performed by executable program code included within the set of data packets when making determinations regarding whether the data packet set should be classified as malware. In certain instances all but a last data packet of the data packet set may also be sent to the destination computer while the analysis computer executes and monitors the program code included in the data packet set. In instances when the analysis computer identifies that the data packet set does include malware, the malware may be blocked from reaching the destination computer by not sending the last data packet to the destination computer.

20 Claims, 6 Drawing Sheets

Related U.S. Application Data continuation of application No. 15/671,445, filed on Aug. 8, 2017, now Pat. No. 10,873,589.

(52) U.S. Cl.
CPC ...... *H04L 63/1433* (2013.01); *H04L 63/1441* (2013.01); *H04L 63/145* (2013.01)

(58) Field of Classification Search
USPC .......................................................... 726/23
See application file for complete search history.

(56) References Cited

U.S. PATENT DOCUMENTS

| | | |
|---|---|---|
| 6,965,968 B1 | 11/2005 | Touboul |
| 7,058,822 B2 | 6/2006 | Edery et al. |
| 7,260,845 B2 | 8/2007 | Kedma et al. |
| 7,523,502 B1 | 4/2009 | Kennedy et al. |
| 7,613,926 B2 | 11/2009 | Edery et al. |
| 7,647,633 B2 | 1/2010 | Edery et al. |
| 7,934,103 B2 | 4/2011 | Kidron |
| 7,962,959 B1 | 6/2011 | Batenin |
| 7,971,255 B1 | 6/2011 | Kc et al. |
| 7,975,305 B2 | 7/2011 | Rubin et al. |
| 8,104,089 B1 | 1/2012 | Guo et al. |
| 8,141,154 B2 | 3/2012 | Gruzman et al. |
| 8,146,151 B2 | 3/2012 | Hulten et al. |
| 8,225,408 B2 | 7/2012 | Rubin et al. |
| 8,276,202 B1 | 9/2012 | Dubrovsky et al. |
| 8,307,432 B1 | 11/2012 | Feng |
| 8,327,137 B1 * | 12/2012 | Erb .......................... G06F 21/53 718/1 |
| 8,413,235 B1 | 4/2013 | Chen et al. |
| 8,539,578 B1 | 9/2013 | Zhou et al. |
| 8,595,829 B1 | 11/2013 | Kane |
| 8,645,923 B1 | 2/2014 | Satish et al. |
| 8,677,494 B2 | 3/2014 | Edery et al. |
| 8,832,836 B2 | 9/2014 | Thomas et al. |
| 8,893,278 B1 * | 11/2014 | Chechik .................. G06F 21/56 713/188 |
| 8,910,238 B2 | 12/2014 | Lukacs et al. |
| 9,141,794 B1 | 9/2015 | Soubramanien et al. |
| 9,202,048 B2 | 12/2015 | Sallam |
| 9,336,386 B1 | 5/2016 | Qu |
| 9,355,247 B1 | 5/2016 | Thioux et al. |
| 9,411,953 B1 | 8/2016 | Kane et al. |
| 9,430,646 B1 * | 8/2016 | Mushtaq ................. H04L 67/02 |
| 9,516,055 B1 | 12/2016 | Liu |
| 9,836,604 B2 | 12/2017 | Coronado et al. |
| 9,882,929 B1 * | 1/2018 | Ettema .................... G06F 21/53 |
| 9,990,497 B2 | 6/2018 | Spernow et al. |
| 10,210,329 B1 | 2/2019 | Malik et al. |
| 10,515,213 B2 | 12/2019 | Stepan et al. |
| 10,685,110 B2 | 6/2020 | Das |
| 10,873,589 B2 | 12/2020 | Cheetancheri |
| 10,902,122 B2 | 1/2021 | Das |
| 11,151,252 B2 | 10/2021 | Das |
| 11,232,201 B2 | 1/2022 | Das |
| 11,550,912 B2 | 1/2023 | Das |
| 11,558,405 B2 | 1/2023 | Cheetancheri |
| 11,797,677 B2 | 10/2023 | Dubrovsky et al. |
| 12,001,554 B2 | 6/2024 | Das et al. |
| 2002/0009079 A1 | 1/2002 | Jungck et al. |
| 2003/0033542 A1 | 2/2003 | Goseva-Popstojanova et al. |
| 2003/0140248 A1 | 7/2003 | Izatt |
| 2006/0155865 A1 * | 7/2006 | Brandt ..................... H04L 69/16 709/230 |
| 2006/0224724 A1 * | 10/2006 | Marinescu .......... H04L 63/1416 709/224 |
| 2007/0157203 A1 | 7/2007 | Lim |
| 2007/0256127 A1 | 11/2007 | Kraemer et al. |
| 2007/0261112 A1 | 11/2007 | Todd et al. |
| 2008/0016339 A1 | 1/2008 | Shukla |
| 2009/0070876 A1 | 3/2009 | Kim et al. |
| 2010/0024033 A1 | 1/2010 | Kang et al. |
| 2010/0185876 A1 | 7/2010 | Kim |
| 2010/0269171 A1 * | 10/2010 | Raz ......................... H04L 9/088 726/13 |
| 2011/0047620 A1 | 2/2011 | Mahaffey et al. |
| 2011/0078794 A1 | 3/2011 | Manni et al. |
| 2011/0277033 A1 | 11/2011 | Ramchetty et al. |
| 2011/0302656 A1 | 12/2011 | El-Moussa |
| 2012/0266243 A1 | 10/2012 | Turkulainen |
| 2013/0007884 A1 | 1/2013 | Franklin et al. |
| 2013/0080625 A1 | 3/2013 | Morinaga et al. |
| 2013/0091584 A1 | 4/2013 | Liebmann et al. |
| 2013/0276056 A1 | 10/2013 | Epstein |
| 2014/0115652 A1 | 4/2014 | Kapoor |
| 2014/0181976 A1 | 6/2014 | Snow et al. |
| 2014/0208426 A1 | 7/2014 | Natarajan et al. |
| 2014/0215621 A1 | 7/2014 | Xaypanya et al. |
| 2015/0089651 A1 | 3/2015 | Mirski et al. |
| 2015/0096018 A1 | 4/2015 | Mircescu |
| 2015/0096022 A1 | 4/2015 | Vincent et al. |
| 2015/0227742 A1 | 8/2015 | Pereira |
| 2016/0098560 A1 | 4/2016 | Friedrichs et al. |
| 2016/0099963 A1 | 4/2016 | Mahaffey et al. |
| 2016/0357958 A1 | 12/2016 | Guidry |
| 2016/0378640 A1 | 12/2016 | Hron |
| 2017/0171240 A1 | 6/2017 | Arzi et al. |
| 2017/0289176 A1 | 10/2017 | Chen et al. |
| 2017/0329621 A1 | 11/2017 | Beckett |
| 2018/0018459 A1 | 1/2018 | Zhang et al. |
| 2018/0052720 A1 | 2/2018 | Ionescu et al. |
| 2018/0288097 A1 | 10/2018 | Poornachandran |
| 2019/0052651 A1 | 2/2019 | Cheetancheri et al. |
| 2019/0065740 A1 | 2/2019 | van Riel et al. |
| 2019/0087572 A1 | 3/2019 | Ellam |
| 2019/0114421 A1 | 4/2019 | Das et al. |
| 2019/0205537 A1 | 7/2019 | Das et al. |
| 2019/0236275 A1 | 8/2019 | Das et al. |
| 2019/0342313 A1 | 11/2019 | Watkiss et al. |
| 2019/0347413 A1 | 11/2019 | Dubrovsky et al. |
| 2019/0354680 A1 | 11/2019 | De Lima, Jr. et al. |
| 2020/0380127 A1 | 12/2020 | Das |
| 2021/0185062 A1 | 6/2021 | Cheetancheri |
| 2022/0035919 A1 | 2/2022 | Das |
| 2022/0222343 A1 | 7/2022 | Dubrovsky et al. |
| 2023/0222214 A1 | 7/2023 | Das et al. |

FOREIGN PATENT DOCUMENTS

| | | |
|---|---|---|
| GB | 2553033 | 2/2018 |
| WO | WO 2019/032702 | 2/2019 |
| WO | WO 2019/075388 | 4/2019 |
| WO | WO 2019/133637 | 7/2019 |
| WO | WO 2019/222261 | 11/2019 |

OTHER PUBLICATIONS

Software Instrumentation, Wiley Encyclopedia of Computer Science and Engineering, edited by Benjamin Wah. Copyright 2008 John Wiley & Sons, Inc.
European Application No. 18844091.1 Extended European Search Report dated Jan. 19, 2021.
European Application No. 18894474.8 Extended European Search Report dated Aug. 3, 2021.
PCT Application No. PCT/US2018/045814 International Preliminary Report on Patentability dated Feb. 11, 2020; 8 pages.
PCT Application No. PCT/US2018/045814 International Search Report and Written Opinion dated Oct. 19, 2018; 9 pages.
PCT Application No. PCT/US2018/055694 International Preliminary Report on Patentability dated Apr. 14, 2020; 7 pages.
PCT Application No. PCT/US2018/055694 International Search Report and Written Opinion dated Feb. 11, 2019; 8 pages.
PCT Application No. PCT/US2018/067541 International Preliminary Report on Patentability dated Jun. 30, 2020; 7 pages.
PCT Application No. PCT/US2018/067541 International Search Report and Written Opinion dated Mar. 27, 2019; 7 pages.
PCT Application No. PCT/US2019/032283 International Preliminary Report on Patentability dated Nov. 17, 2020; 9 pages.

(56) References Cited

OTHER PUBLICATIONS

PCT Application No. PCT/US2019/032283 International Search Report and Written Opinion dated Sep. 12, 2019; 10 pages.
U.S. Appl. No. 15/671,445 Office Action mailed May 14, 2020.
U.S. Appl. No. 15/671,445 Final Office Action mailed Aug. 15, 2019.
U.S. Appl. No. 15/671,445 Office Action mailed Feb. 25, 2019.
U.S. Appl. No. 15/783,793 Office Action mailed Feb. 22, 2021.
U.S. Appl. No. 15/783,793 Final Office Action mailed Oct. 14, 2020.
U.S. Appl. No. 15/783,793 Office Action mailed Apr. 16, 2019.
U.S. Appl. No. 15/783,793 Final Office Action mailed Dec. 11, 2019.
U.S. Appl. No. 15/783,793 Office Action mailed Jun. 28, 2019.
U.S. Appl. No. 15/858,785 Office Action mailed Sep. 6, 2019.
U.S. Appl. No. 16/903,060 Office Action mailed May 12, 2022.
U.S. Appl. No. 15/890,192 Office Action mailed Jun. 11, 2020.
U.S. Appl. No. 15/890,192 Final Office Action mailed Jan. 21, 2020.
U.S. Appl. No. 15/890,192 Office Action mailed Oct. 4, 2019.
U.S. Appl. No. 16/055,958 Office Action mailed Mar. 25, 2021.
U.S. Appl. No. 16/055,958 Final Office Action mailed Oct. 9, 2020.
U.S. Appl. No. 16/055,958 Office Action mailed Apr. 21, 2020.
U.S. Appl. No. 17/584,152 Office Action mailed Feb. 16, 2023.
U.S. Appl. No. 17/505,327 Office Action mailed Aug. 16, 2023.
U.S. Appl. No. 18/095,340, Office Action dated Jan. 5, 2024.
European Application No. 22208411.3 Extended European Search Report dated Mar. 21, 2023.

* cited by examiner

REAL-TIME PREVENTION OF MALICIOUS CONTENT VIA DYNAMIC ANALYSIS

CROSS REFERENCE TO RELATED APPLICATIONS

This application is a continuation and claims the priority benefit of U.S. patent application Ser. No. 17/128,639 filed Dec. 21, 2020, which is a continuation and claims the priority benefit of U.S. patent application Ser. No. 15/671,445 filed Aug. 8, 2017, now U.S. Pat. No. 10,873,589, the disclosures of which are incorporated herein by reference.

BACKGROUND OF THE INVENTION

Field of Invention

The present invention generally relates to identifying whether data transmitted between different computer systems includes malicious content. More specifically, the present invention relates to identifying whether malware is included in one or more data packets transmitted from a first computer to a second computer.

Description of the Related Art

One of the greatest threats to privacy and to secure computer data are various sorts of computer malware, such as computer viruses or eavesdropping software. Generally malware can be any software program that includes code that executes without the knowledge or authorization of an owner or user of a computing device.

Malware are typically distributed by parties with nefarious intent. Malware is commonly used steal or destroy computer data or to snoop or spy the actions of a user when the user operates a computer. Malware is also frequently used to damage a computer or to damage computer data. For example malware may be used to steal personal or financial information, blackmail computer users by denying access to their own data unless or until a fee is paid, or to damage infected computers by damaging data stored on those infected computers.

Furthermore, newly developed malware is increasingly difficult to identify. Frequently, until a particular sort of malware has been identified and characterized, conventional techniques that identify whether a communication includes malware can miss detecting the presence of that malware in the communication. This may occur when information in one or more received data packets is hidden or when the malware is not identifiable by a signature associated with the information in the received data packets.

Since computer data is frequently transmitted from computer to computer via one or more data packets, data packets are commonly scanned for malware at a firewall, at a network device, or on a computer of a user before they can be received or executed at a user device. Scanning methods, such as deep packet inspection (DPI) are not able to identify new malware threats, as they rely on pattern matching that identifies attributes or signatures of malicious computer data that have been previously identified and characterized. As such, conventional methods for identifying whether a received set of data packets includes malware may not be able to identify a new malware threat.

What are needed are new methods and systems that identify malware threats that have not been encountered before via dynamic behavior simulation of the given threat AND at the same time ensure real-time prevention/blocking of such threats by not being limited to just detection and logging of threats.

SUMMARY OF THE CLAIMED INVENTION

The presently claimed invention relates to a method, a non-transitory computer readable storage medium, or an apparatus executing functions consistent with the present disclosure for preventing malicious content from reaching a destination. A method consistent with the present disclosure may include receiving a plurality of data packets sent from a source computer to a destination computer, where each of those data packets sent from the source computer to the destination computer are then sent to the destination computer except for at least one packet. After those data packets are received, instructions associated with the plurality of data packets may be executed while actions associated with those instructions are observed. The observation of the execution of the instructions may identify an action performed by the executed instructions is an unauthorized action, and an identification that the plurality of data packets includes malware may be made when action performed is the unauthorized action. This method may also include not sending at least one data packet the destination computer when the malware is identified as being included in the plurality of data packets, thereby preventing the destination computer from receiving the malware in a functional state.

When the method of the presently claimed invention is performed by a non-transitory computer readable storage medium, a processor executing instructions out of a memory may also receive a plurality of data packets sent from a source computer to a destination computer, where each of those data packets sent from the source computer to the destination computer are then sent to the destination computer except for at least one packet. After those data packets are received, instructions associated with the plurality of data packets may be executed while actions associated with those instructions are observed. The observation of the execution of the instructions may identify an action performed by the executed instructions is an unauthorized action, and an identification that the plurality of data packets includes malware may be made when action performed is the unauthorized action. This method may also include not sending at least one data packet the destination computer when the malware is identified as being included in the plurality of data packets, thereby preventing the destination computer from receiving the malware in a functional state.

An apparatus of the presently claimed invention may include an analysis computer that receives a plurality of data packets sent from a source computer to a destination computer, the analysis computer including a memory, a processor executing instructions out of the memory, and a network interface that receives a plurality of data packets sent from a source computer to a destination computer, where each of those data packets sent from the source computer to the destination computer are then sent to the destination computer except for at least one packet. After those data packets are received, instructions associated with the plurality of data packets may be executed while actions associated with those instructions are observed. The observation of the execution of the instructions may identify an action performed by the executed instructions is an unauthorized action, and an identification that the plurality of data packets includes malware may be made when action performed is the unauthorized action. This method may also include not sending at least one data packet the destination computer when the malware is identified as being included in the plurality of data packets, thereby preventing the destination computer from receiving the malware in a functional state.

DETAILED DESCRIPTION

Figure 1:
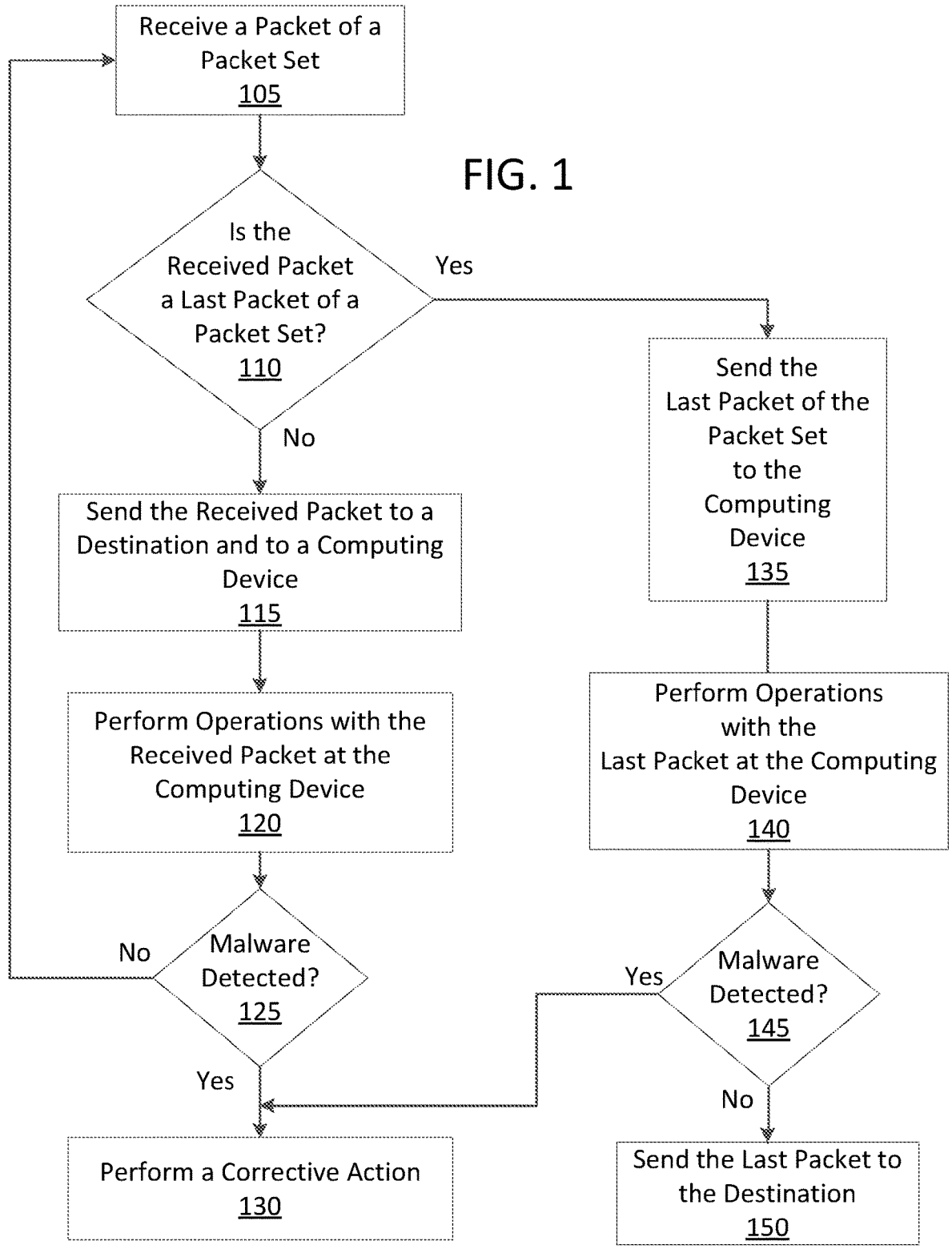
FIG. 1 illustrates a flow diagram consistent with the present disclosure where data included in downloaded data packets are received and analyzed for the presence of malware.

This disclosure is related to methods and apparatus used to for preventing malicious content from reaching a destination via a dynamic analysis engine may operate in real-time when packetized data is received. Data packets sent from a source computer to a destination computer may be initially received by a firewall and be forwarded to an analysis computer. The analysis computer may then monitor actions performed by executable program code included within the set of data packets when making determinations regarding whether the data packet set should be classified as malware. In certain instances all but a last data packet of the data packet set may also be sent to the destination computer while the analysis computer executes and monitors the program code included in the data packet set. By receiving performing operations on those data packets, such as forwarding those data packets to the analysis computer or not sending the last data packet to the destination computer, the firewall performs the function of "intercepting" data packets as it receives those data packets. The dynamic analysis may be performed in real-time or near real-time, thereby optimizing the efficiency of malware threat detection while optimizing network bandwidth. When the analysis is performed by a dedicated analysis engine may enable the performance of a firewall to be improved as wall.

When the analysis computer identifies that the data packet set does include malware, the malware may be blocked from reaching the destination computer by not sending the last data packet to the destination computer. The methods and apparatus described herein may also prepare data included in a set or stream of data packets for evaluations that may identify whether the malware is included in the data packet set.

As the computing device receives the data packets from the firewall, the computing device may prepare data included in the data packets for evaluation after which the computing device may analyze data included in the data packet set to see if that data includes malware. The preparation of the data in the data packets for evaluation may include de-obfuscating the data included in the data packets, where the de-obfuscation may include decrypting or reordering/resequencing data included in the data packets. When data packets are encrypted, data included in those data packets may by decrypted using decryption algorithm associated with a secure transfer session. In certain instances, a portion of the data included in the data packet set may be decrypted. The decryption may include XORing at least a portion of the data included in the data packet set with other data or with other data included in the data packet set. In certain instances decryption according to standard secure methods for delivering packages may be considers authorized functions, where unexpected decryptions may be associated with an unauthorized function. As such, the XORing of data in a packet set may be cause a data packet set to be classified as malware.

An Example of reordering/resequencing received data includes reorganizing received data according to an interleaving process that reshuffles. Such a process is similar to shuffling a deck of cards where each card is equivalent to one or more data bits/bytes. In such instances, data from different portions of a packet or from different packets may be reorganized forming an executable data set that may include malware. To accomplish this, code included in one or more packets may include instructions for reordering data included in the data set after it is received. The execution of those instructions may generate malicious code from data that has intentionally been obfuscated to prevent a deep packet inspection engine from detecting malware hidden within the data packet set.

The analysis of the data in the data packets may include executing program code included in the data packets and monitoring the execution of that program code when watching for unauthorized or suspicious actions performed by the program code. Unauthorized actions include, yet are not limited to writing to a boot block, updating a system registry, making changes to the file system, deleting computer data, copying data, transmitting data to another computer, or intercepting calls to a set of basic input/output instructions (BIOS) of a computer executing that program code. The intercepting of BIOS calls by the program code may be identified by observing program code replacing an original BIOS related command with another command or by observing that program code modifying parameters that were included in the original BIOS related command before the original BIOS command can be executed. As such, the analysis function may execute program code for the destination computer using a "Sandboxing" technique, thus allowing the program code to be evaluated for malware in a secure environment. In certain instances, methods and apparatus consistent with the present disclosure may combine "Sandboxing" with deep packet inspection (DPI). Once malware has been identified, signatures may be generated from the packet data for future use by processors that perform a DPI function. Sandboxing and DPI may be performed in parallel, thus detecting malware that has not been previously identified may be identified by a "Sandboxing" technique or detecting malware that has been previously identified may be identified via matching DPI techniques.

The analysis of data included in the data packet set may also observer the execution of program code and identify that the executed program code performs a function relating to organizing further instructions for execution from data included in the plurality of data packets. Once observed, this analysis may then classify this reorganization of data as an unauthorized action after which the data packet set may be blocked. As such, content included in a data set may be classified as malware based on how or what functions program code within that data set are performed.

Determinations relating to the identification of malware may also be based on a set of rules that identify what program behaviors are authorized or that are unauthorized. For example, a rule may be used to classify data within a data packet set as malware whenever data within that data set is reorganized/reshuffled or when data within that data set is manipulated or de-obfuscated by an XOR function. Alternatively another rule may indicated that the decryption of packet data is acceptable as long as it is performed in a manner consistent with a standard or expected type of decryption (such as decryption associated with a TCP communication). This other rule may also indicate that further analysis of program data is required after the decryption has been performed.

Even in instances where the reorganization of data is observed, methods consistent with the present disclosure may include continuing the analysis of program code included in a data packet set with the intent of identifying whether that program code performs malicious actions and what malicious acts it does perform. Furthermore, signatures may be generated from the reorganized data for later use by a deep packet inspection (DPI) engine, for example.

FIG. 1 illustrates a flow diagram consistent with the present disclosure where data included in downloaded data packets are received and analyzed for the presence of malware. Step 105 of FIG. 1 receives a packet associated with a set of packets. After the packet of the packet set is received in step 105, step 110 of FIG. 1 identifies whether the received packet is a last packet of the data set, when no program flow flows to step 115 where the received packet is sent to a destination and to a computing device. At the point in time when the received packet is sent to the destination and to the computing device, no determination has been made as to whether the packet set includes malware. In certain instances, the computing device may be a computer in the Cloud that is accessible via the Internet and the computing device may perform a service of identifying whether received data packet sets include malware. These services may be provided for subscribed users. Alternatively, the computing device may reside in a corporate network or be part of a computer network associated with a user computer that is a destination associated with a set of data packets. In certain instances, a computer that initially receives data packets may also be the computing device that performs operations relating to identifying whether received data packets include malware. In other instances more than one computer may perform these functions, for example a firewall could receive data packets and send them to another computer for analysis.

After step 115, program flow moves to step 120 where operations are performed with the received packet at the computing device. Operations performed at the computing device may include de-obfuscating information in the data packet, may include resequencing the order of received data, or may include any operation that renders or transforms received information associated with the received set of packets into a form executable by a processor. As such, operations performed in step 120 may be related to decryption of data included in received packets, executing sets of instructions that re-sorts the order of instructions included in the received packets, and/or executing instructions included in the received data packets.

After step 120, determination step 125 of FIG. 1 identifies whether malware has been detected/identified in the packet set. When step 125 identifies that the data packet set includes malware, program flow moves to step 130 where a corrective action may be performed. This corrective action may include dropping a connection associated with the received packets, stopping the receipt of data packets, or stopping the re-transmission of packets associated with the packet set. Corrective actions may also include storing information that helps characterize or identify that a source of the packets is not a reputable source of data packets. Another corrective action may relate to storing signatures or other identifying attributes associated with the received data packets, such that these signatures or identifying attributes may be used to more rapidly identify the malware when subsequently received. As such, the methods and apparatus consistent with the present disclosure may combine "Sandboxing," where instructions included in a data packet set are executed at the computing device, with deep packet inspection (DPI) that identifies patterns or signatures that have been previously identified as being malicious.

When the received data packets include executable code, all of the data packets associated with the packet set being received may have to be received by the computing device before the executable code is executed at the computing device. As such, program flow may alternatively not include step 125 being performed after step 120. In such instances, program flow may flow from step 120 back to step 105 without performing step 125. When malware is not detected, program flow moves from step 125 to step 105 where additional data packets may be received.

When determination step 110 identifies that the received data packet is the last data packet, the last data packet may be sent to the computing device in step 135 of FIG. 1. Next, in step 140 of FIG. 1 operations may be performed with data included in the last packet and operations associated may be performed after the data packet set is received in its entirety. As such, the operations included in step 140 may include some or all of the operations discussed in respect to step 120 of FIG. 1. In instances where data packets are received out-of-order, the last packet received may not be a packet that is truly the last packet of a packet set, yet may be a last received packet of the packet set.

After step 140, determination step 145 identifies whether malware is detected in the packet set. When malware is detected, program flow moves to step 130 where one or more corrective actions may be performed. Here again corrective actions may include dropping a connection associated with the received packets, stopping the receipt of data packets, stopping the re-transmission of packets associated with the packet set, storing information that helps characterize or identify that a source of the packets is not a reputable source of data packets, and/or storing signatures or other identifying attributes associated with the received data packets. Furthermore, these signatures or identifying attributes may be used to more rapidly identify the malware when subsequently encountered.

When malware is not detected in the set of packets, program flow may move from step 145 to step 150 of FIG. 1, where the last packet is sent to the destination.

Figure 2:
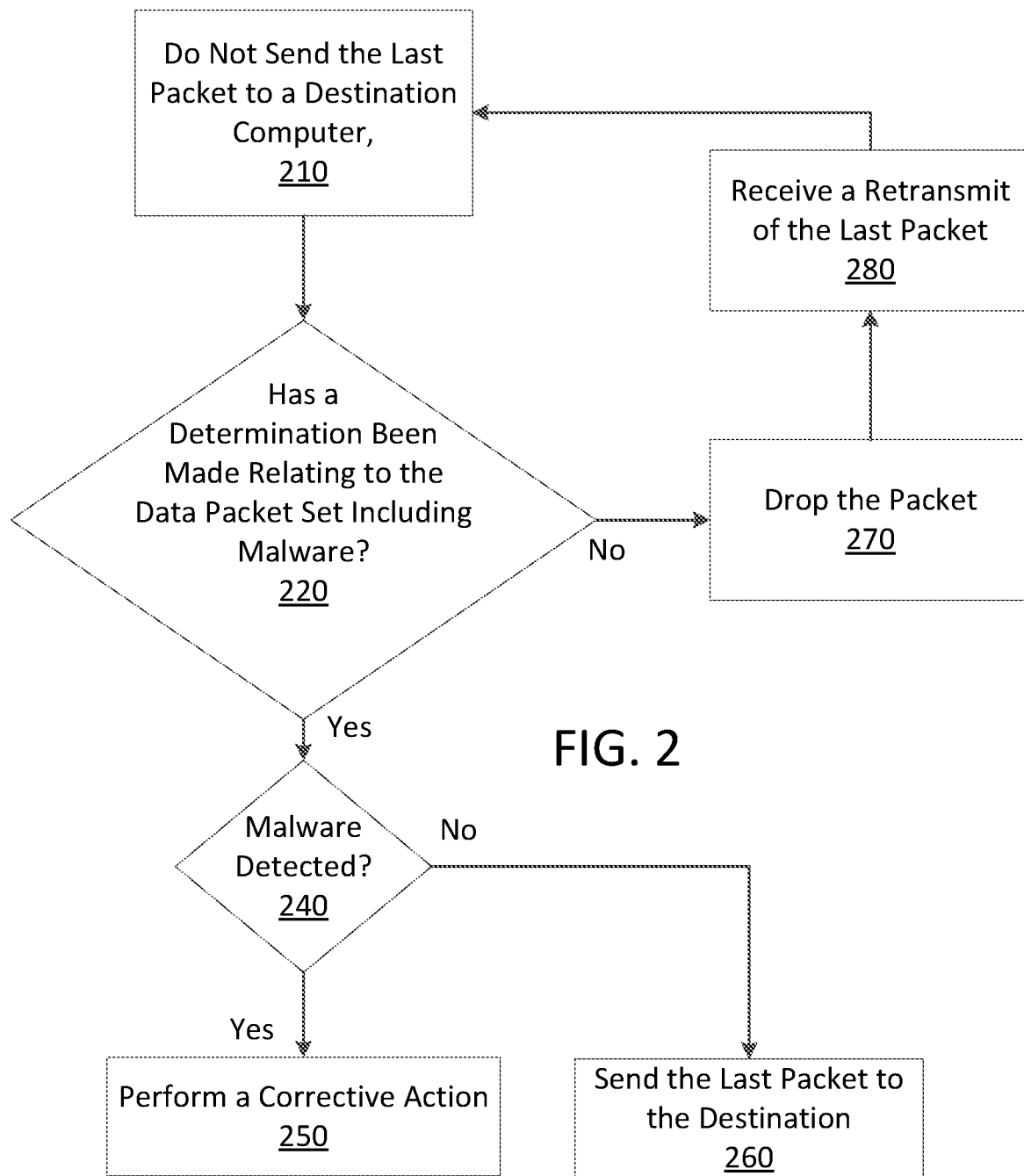
FIG. 2 illustrates an exemplary set of steps that may be performed when a set of data packets are received by a computing device.

FIG. 2 illustrates an exemplary set of steps that may be performed when a set of data packets are received by a computing device. Here again, all by a last data packet of the data packet set may be sent to the destination computer while another computer evaluates data included in the data packet set for malware. The not transmitting of the last data packet to the destination computer in step 210 of FIG. 2 may cause the computer that sent to data packet set to identify that the last data packet was "dropped" or "lost" in transmission.

After step 210, step 220 of FIG. 2 identifies whether a determination has been made relating to whether the data packet set includes malware. When a determination has not yet been made in determination step 220, program flow may move from step 220 to step 270 the last data packet may be dropped, then program flow moves to step 280 where a retransmission of the last data packet is received. The retransmission of the last data packet may have been performed by the computer that originally sent the data packet set based on that sending computer not receiving an acknowledgement indicating that the last data packet was received at the destination computer. Such retransmissions are a part of the standard operation of packetized data transfer of computer data, for example, communications sent via the transmission control protocol (TCP) will be retransmitted from a sending computer when the sending computer does not receive an acknowledgment indicating that a particular data packet was received by a destination computer.

After step 270, program flow moves back to step 210 where the last data packet is dropped again. Program flow may move from step 210, to step 220, to step 270, and back to step 210 repetitively until a determination has been made in step 220.

After a determination has been made in step 220, step 240 may identify whether malware has been detected in the data packet set. When malware has been detected in the data packet set, program flow may move from step 240 to step 250 of FIG. 2, where a corrective action is performed. Here again the corrective action performed may correspond to one or more of the corrective actions discussed in respect to FIG. 1 above.

When step 240 indicates that malware is not detected in the set of data packets, program flow moves from step 240 to step 260 where the last data packet is sent to the destination.

Figure 3:
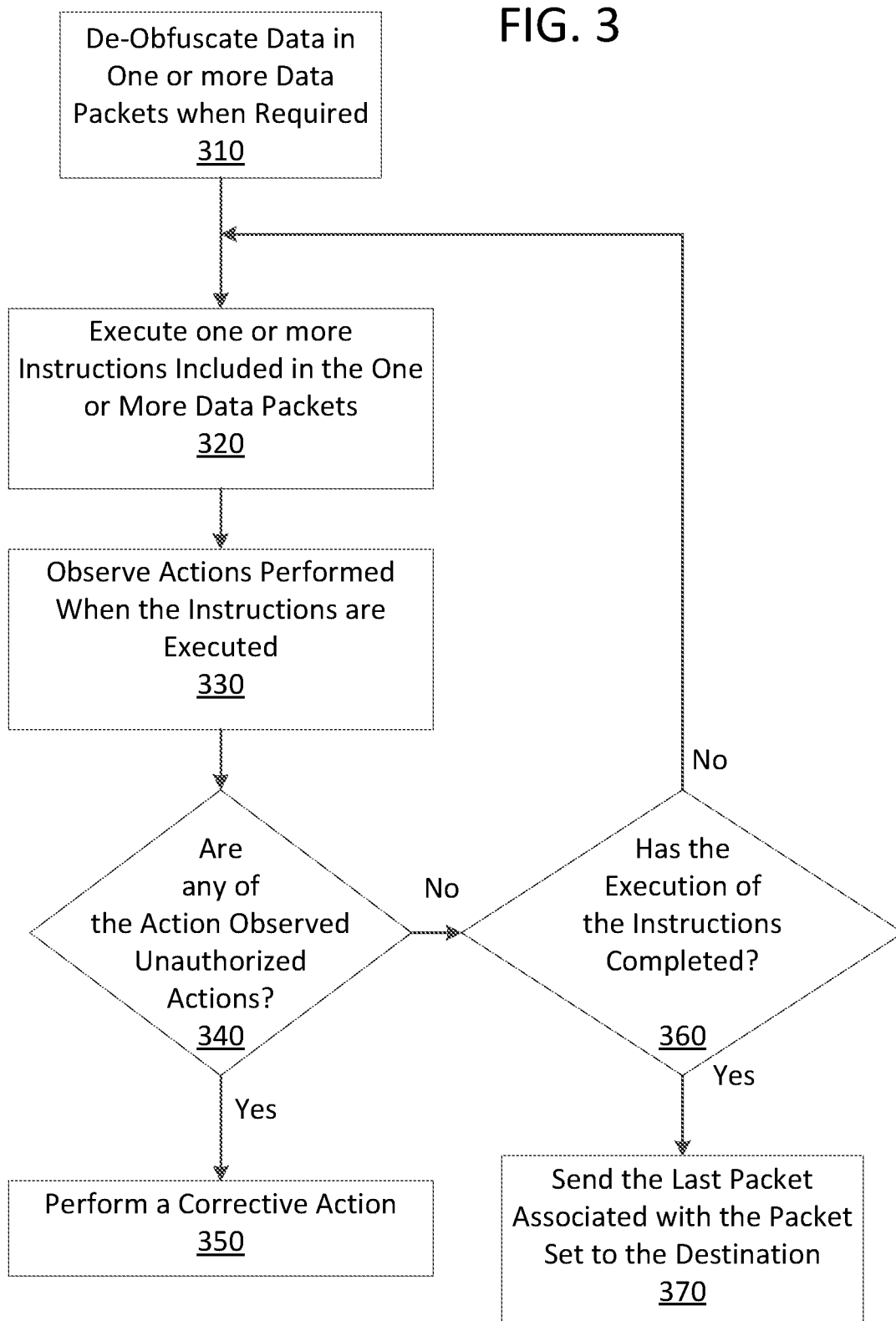
FIG. 3 illustrates a set of steps that may be performed when data packets associated with a set of data packets are received.

FIG. 3 illustrates a set of steps that may be performed when data packets associated with a set of data packets are received. Step 310 is a step where data included in one or more data packets of the data packet set are de-obfuscated. This de-obfuscation operation may include one or more steps, including, yet not limited to decrypting data in the received data packets or re-sequencing data in the data packets.

After step 310, step 320 may execute one or more instructions included in or associated with the received set of data packets. Step 330 of FIG. 3 is a step where actions performed when the instructions are executed are observed. After step 330, step 340 identifies whether any unauthorized action is performed by the executable code when it executes. Unauthorized actions are actions where program code included in a set of data packets accesses or send information that is considered inappropriate. Unauthorized action may also include writes to one or more data storage locations that are considered sensitive. Examples of unauthorized actions include, yet are not limited to accessing or transmitting data: such as registry data, passwords, user account information, WEB browsing historical information, file system data, and or financial information. Additional examples of unauthorized action include writing to a computer registry, writing to the boot block of a data storage device, such as writing to Logical Block Address zero (LBA 0) of a disk drive, writing to a data storage location where program data is stored, and/or the operation of of code that prevents the normal operation or booting of a computer system. Such unauthorized actions can significantly affect the performance of a destination computer or can render the computer system unusable by a user. For example, overwriting LBA 0 of a disk drive can prevent the booting of a computer system because LBA 0 is typically used to store data that is required for that computer to boot (startup and initialize).

When an unauthorized action is identified in step 340, program flow may move from step 340 to step 350 of FIG. 3. Here again corrective actions performed may include any of the corrective actions discussed in respect to FIG. 1.

When an unauthorized action is not identified in step 340, program flow may move to step 360 that determines whether the execution of the instructions included in the set of data packets has completed, when no program flow moves from step 360 back to step 320 where the execution of the instructions included in the data packet set are continued.

When step 360 identifies that the instructions included in the data packet set have completed, program flow moves to step 370 where the last packet associated with the data packet set is sent to the destination.

Figure 4:
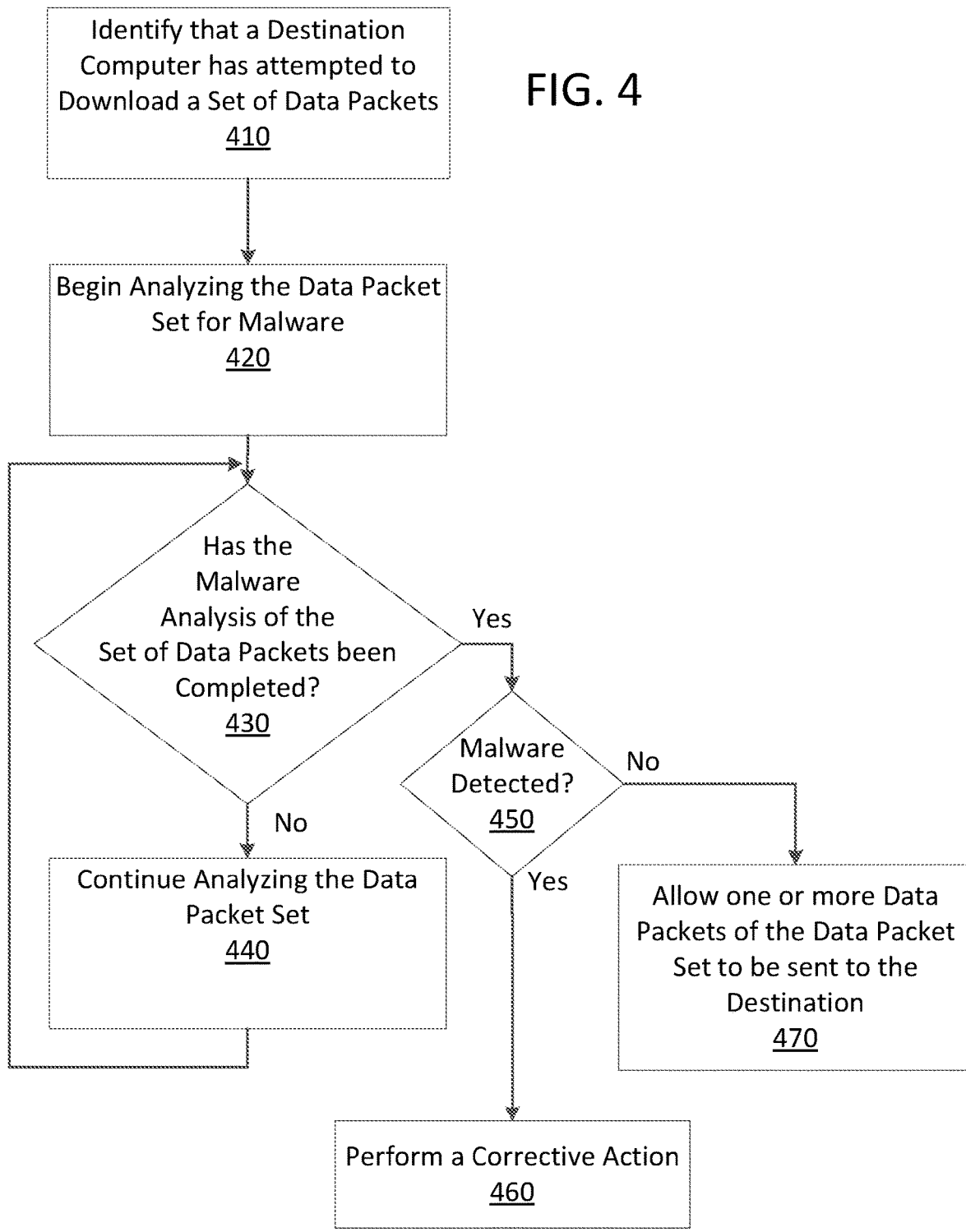
FIG. 4 illustrates an exemplary set of program steps that may be performed when data packets associated with a set of data packets are analyzed by a computing device.

FIG. 4 illustrates an exemplary set of program steps that may be performed when data packets associated with a set of data packets are analyzed by a computing device. These data packets may be analyzed after a user request to access a webpage universal resource locator (URL) or to download a file has been received from a destination computer. Step 410 of FIG. 4 is a step where identification that the destination computer has attempted to download a set of data packets is made. This identification may be made immediately as the destination computer attempts to download the data packet set. After step 410, step 420 of FIG. 4 is where the set of data packets is analyzed for the presence of Malware.

Next, a determination as to whether the malware analysis of the set of data packets has completed may be performed in step 430 of FIG. 4. When the malware analysis has not yet completed, program flow moves to step 440 where the analysis of the data packet set is continued, after which program flow moves back to step 430 of FIG. 4. When this analysis continues, a message (not illustrated) may be sent to the destination computer for presentation to a user. The message may indicate that a background process associated with analyzing the set of data packets is being performed to determine whether those data packets include malware or whether they are benign (appear to be free of malware). This message may also inform the user that data related to the attempted download will be provided to the destination computer if the analysis indicates that the download does not include malware.

When step 440 identifies that the malware analysis has completed, program flow moves to step 450 that identifies whether malware has been detected in the packet set. When malware has been detected in the packet set, program flow moves to step 460 where a corrective action is performed. This corrective action may include blocking the download (not sending a last or remaining packet to the destination device) and may also include sending a message to the destination computer to inform the user that malware has been detected in the download data.

When malware is identified as not being present in the download data in step 440, one or more data packets may be allowed to be sent to the destination computer, such that the destination computer receives the requested downloadable data. The steps of FIG. 4 may be performed by one or more computing devices that analyze the content of data packets as a background task that the user does not have to actively manage. Even when the analysis of the receive data packets takes a significant amount of time, the user of the destination computer will be free to perform other tasks while malware analysis is being performed.

The method of FIG. 4 may prevent a user from attempting to download a specific file, data set, or webpage repetitively. In instances where a user does repetitively attempt to download the same file while an analysis is being performed, they may be provided a message that indicates that a "verdict" relating to whether the download includes malware is still "pending." Repetitive requests may be intercepted by a computer, such as a firewall, and not be sent to the source computer from which the download has been requested, thus preventing the source computer from receiving repetitive requests and saving network bandwidth at a home network that might otherwise be consumed performing unnecessary repetitive data transfers related to the repetitive requests. One or more computers implementing the functionality of FIG. 4 may perform functions associated with receiving a data set, analyzing that data set, managing the delivery of the data set to a destination computer, or may perform a repetitive download of that data set only as required, without the user of the destination computer attempting to repetitively download the data set.

While the receiving and transmission of data packets of the present disclosure may be performed by a firewall and while the analysis of data contained within those data packets and "Sandboxing" may be performed by an analysis computer, these actions may alternatively be performed by a single computer.

Figure 5:
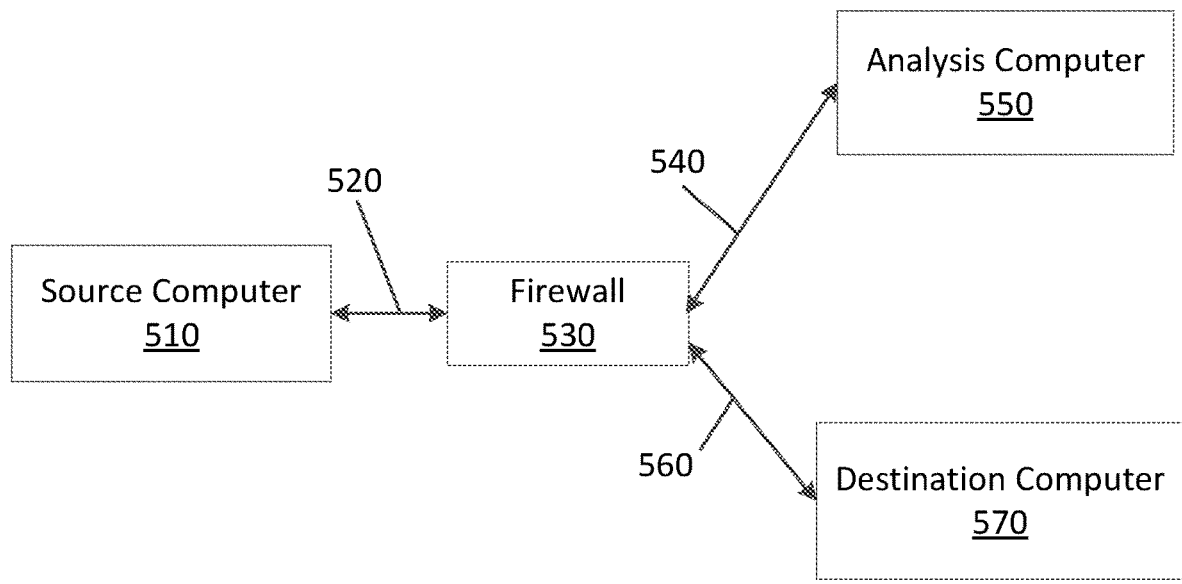
FIG. 5 illustrates a firewall communicating with an analysis computer when data packets sent from a source computer are received by and sent from the firewall.

FIG. 5 illustrates a firewall communicating with an analysis computer when data packets sent from a source computer are received by and sent from the firewall. FIG. 5 includes a source computer 510, a firewall 530, an analysis computer 550, and a destination computer 570. FIG. 5 also includes communications 520 sent to/from the destination computer 570 via firewall 530, communications 560 sent to/from the destination computer 570, and communications 550 sent between the firewall 530 and the analysis computer 550. Note that communications 520 may be transmitted over a computer network such as the Internet, that communications 560 may be sent over computer network interfaces at the firewall 530 and at the destination computer 560, and that communications 540 may be sent between the firewall and the analysis computer via computer network interfaces at the firewall 530 and the analysis computer 550. Note also that any of the computer networks over which communications 520, 540, and 560 are sent may include wired or wireless network interfaces. Analysis computer 550 may also be remote from firewall 530 and analysis computer 550 may reside in the Cloud. Network interfaces associated with the present disclosure may include any form of wired or wireless network interface known in the art.

The various components of FIG. 5 may implement functions associated with the receipt and analysis of computer data that may have been requested by destination computer 570 and have been provided by source computer 510. In such instances, firewall 530 and analysis computer 550 may perform functions consistent with receiving packets, providing messages, or analyzing computer data sent from source computer 510 when identifying whether the requested downloaded data includes malicious content. As such firewall 530 and analysis computer 550 may perform functions consistent with the present disclosure, including those functions described in respect to FIGS. 1-4.

Figure 6:
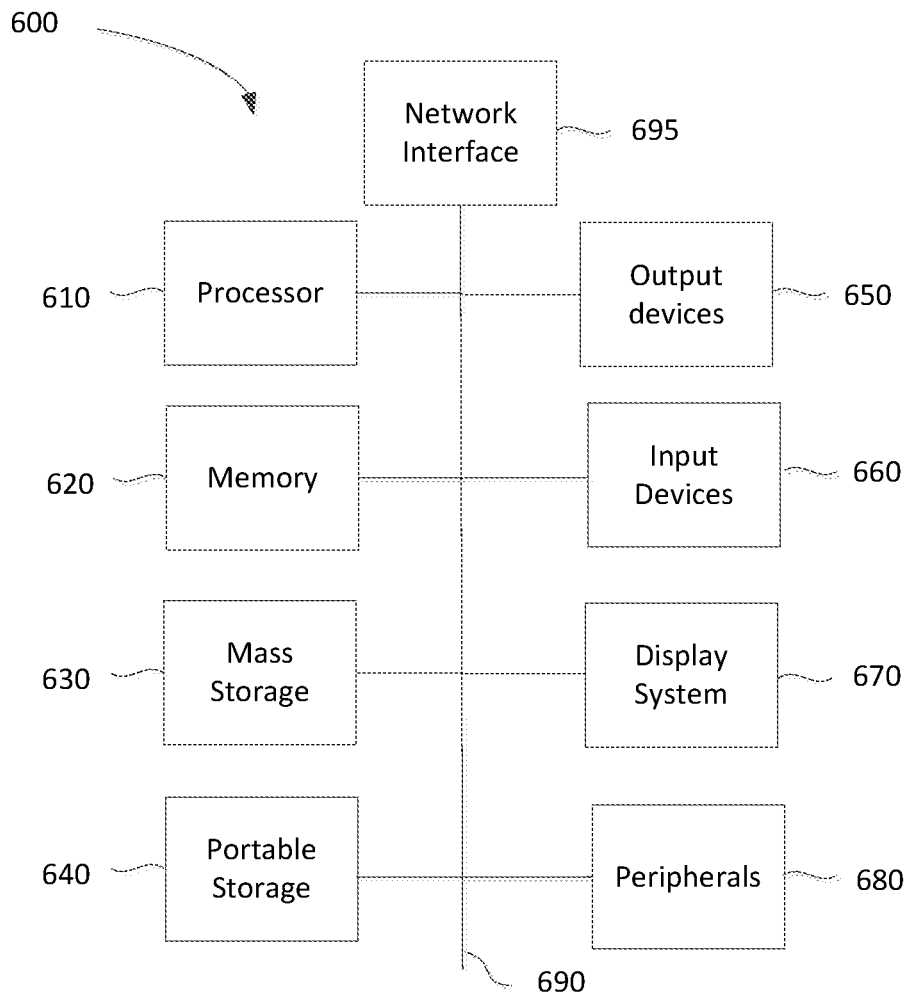
FIG. 6 illustrates a computing system that may be used to implement an embodiment of the present invention.

FIG. 6 illustrates a computing system that may be used to implement an embodiment of the present invention. The computing system 600 of FIG. 6 includes one or more processors 610 and main memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, peripheral devices 680, and network interface 695.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a FLASH memory, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem or a router.

Network interface 595 may include any form of computer interface of a computer, whether that be a wired network or a wireless interface. As such, network interface 595 may be an Ethernet network interface, a BlueTooth™ wireless interface, an 802.11 interface, or a cellular phone interface.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 600 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for detecting malicious content, the method comprising:
    receiving data at a sandbox device, wherein the data is received from a separate firewall device after the separate firewall device receives the data from a sender device, a first portion of the data being sent to a destination device while holding a second portion of the data at the separate firewall device until at least after an observation of the data at the sandbox device;
    observing that a first action is performed when instructions included in the received data are executed at the sandbox device;
    performing a deep packet inspection (DPI) scan in parallel on the received data;
    identifying that the first action is suspicious; and
    performing a corrective action based on the first action being identified as suspicious.

2. The method of claim 1, wherein the suspicious first action includes reorganizing data within the received data, and wherein the first action is performed when instructions included in the reorganized data are executed at the sandbox device; and further comprising identifying that the first action is classified as malicious based on the reorganization of data.

3. The method of claim 2, wherein the first action includes accessing an inappropriate data storage location.

4. The method of claim 2, wherein the first action includes de-obfuscating additional instructions included in the received data.

5. The method of claim 1, further comprising sending a message to the separate firewall device identifying that the received data is malicious, wherein the separate firewall device drops the second portion of the data based on the message indicating that the received data is malicious.

6. The method of claim 1, further comprising:
    identifying an attribute associated with the received data; and
    storing the attribute associated with the received data.

7. The method of claim 1, further comprising:
    generating a signature from the received data; and
    storing the signature at a deep packet inspection data store.

8. The method of claim 7, further comprising:
    generating a second signature from a second set of received data;
    identifying that the stored signature matches the second signature; and
    identifying that the second set of received data includes the malicious instructions based on the stored signature matching the second signature.

9. The method of claim 1, wherein the first action includes intercepting a basic input/output (BIOS) instruction.

10. The method of claim 1, wherein the first action includes preparing to transmit data from the sandbox device.

11. The method of claim 1, wherein the first action is identified as suspicious based on the DPI scan indicating that the received data matches one or more previously identified patterns.

12. The method of claim 1, wherein the first action is observed while the DPI scan is performed based on the sandbox device being a multi-processor platform.

13. A non-transitory computer-readable storage medium having embodied thereon a program executable by a processor for implementing a method for detecting malicious content, the method comprising:
    receiving data at a sandbox device, wherein the data is received from a separate firewall device after the separate firewall device receives the data from a sender device, a first portion of the data being sent to a destination device while holding a second portion of the data at the separate firewall device until at least after an observation of the data at the sandbox device;
    observing that a first action is performed when instructions included in the received data are executed at the sandbox device;

performing a deep packet inspection (DPI) scan in parallel on the received data;
identifying that the first action is suspicious; and
performing a corrective action based on the first action being identified as suspicious.

14. The non-transitory computer-readable storage medium of claim 13, wherein the suspicious first action includes reorganizing data within the received data, and wherein the first action is performed when instructions included in the reorganized data are executed at the sandbox device; and further comprising identifying that the first action is classified as malicious based on a signature associated with the reorganization of data.

15. The non-transitory computer-readable storage medium of claim 14, wherein the first action includes accessing an inappropriate data storage location.

16. The non-transitory computer-readable storage medium of claim 13, the program is further executable to send a message to the separate firewall device identifying that the received data is malicious, wherein the separate firewall device drops the second portion of the data based on the message indicating that the received data is malicious.

17. The method of claim 13, further comprising:
identifying an attribute associated with the received data; and
storing the attribute associated with the received data.

18. The method of claim 13, further comprising:
generating a signature from the received data; and
storing the signature at a deep packet inspection data store.

19. The non-transitory computer-readable storage medium of claim 13, wherein the first action includes intercepting a basic input/output (BIOS) instruction.

20. A system for detecting malicious content, the system comprising:
a firewall device that:
receives a data set based on information received from a destination device;
sends the data set for analysis,
sends a first portion of the data set to the destination device, and
holds a second portion of the data set at the firewall device without immediately sending the second portion of the data set to the destination device;
a sandbox device that is separate from the firewall device, wherein the sandbox device:
receives the data set from the firewall device,
performs the analysis,
observes that a first action is performed when instructions included in the first data set are executed based on the analysis,
identifies that the first action is suspicious, and
performs a corrective action based on the first action being identified as being suspicious, wherein the corrective action occurs after the observation of the data at the sandbox device; and
a deep packet inspection (DPI) engine executable to perform a DPI scan in parallel on the received data.

* * * * *